(12) United States Patent
Frota de Souza Filho et al.

(10) Patent No.: US 9,662,714 B2
(45) Date of Patent: May 30, 2017

(54) HYDRAULIC CHUCK WITH A REDUCTION SLEEVE

(71) Applicant: Kennametal Inc., Latrobe, PA (US)

(72) Inventors: Ruy Frota de Souza Filho, Latrobe, PA (US); Josef K. Herud, Herzogenaurach (DE); Mahima R. Kulkarni, Bengaluru (IN); Santhosha Boregowda Borapura, Maddur (IN)

(73) Assignee: KENNAMETAL INC., Latrobe, PA (US)

( * ) Notice: Subject to any disclaimer, the term of this patent is extended or adjusted under 35 U.S.C. 154(b) by 330 days.

(21) Appl. No.: 14/285,011

(22) Filed: May 22, 2014

(65) Prior Publication Data
US 2014/0353931 A1 Dec. 4, 2014

(30) Foreign Application Priority Data
May 28, 2013 (IN) ............ 2319/CHE/2013

(51) Int. Cl.
*B23B 31/20* (2006.01)
*B23B 31/30* (2006.01)
*B23B 31/02* (2006.01)

(52) U.S. Cl.
CPC .......... *B23B 31/204* (2013.01); *B23B 31/028* (2013.01); *B23B 31/305* (2013.01);
(Continued)

(58) Field of Classification Search
CPC ... B23B 31/028; B23B 31/204; B23B 31/305; B23B 2231/20; Y10T 279/1249; Y10T 279/17351; Y10T 279/17435
See application file for complete search history.

(56) References Cited

U.S. PATENT DOCUMENTS 4,387,906 A * 6/1983 Nicolin ............... B23B 31/204
279/2.02
5,979,911 A * 11/1999 Rinne .................. B23B 31/204
279/4.08
(Continued)

FOREIGN PATENT DOCUMENTS

DE 102011106421 B3 10/2012
DE 202012104969 U1 * 2/2013 ............ B23B 31/02
(Continued)

OTHER PUBLICATIONS

May 12, 2015—First_Office_Action—SE14506182.
(Continued)

*Primary Examiner* — Eric A Gates
(74) *Attorney, Agent, or Firm* — Matthew S. Bedsole

(57) ABSTRACT

A hydraulic expansion chuck for receiving a tool includes a chuck body, an expansion bushing which is received in the chuck body and defines a chuck opening, a pressure chamber which is interposed between the expansion bushing and the chuck body, and a reduction sleeve. The reduction sleeve is received in the chuck opening of the expansion bushing and defines a tool holder receptacle for receiving the tool to be chucked. The reduction sleeve includes a connector element configured to releasably attach the reduction sleeve to the chuck body. The reduction sleeve also may include an adjustment element configured to adjust the axial position of the tool in the tool holder receptacle.

16 Claims, 15 Drawing Sheets

(52) U.S. Cl.
CPC ..... *B23B 2231/20* (2013.01); *B23B 2260/026* (2013.01); *B23B 2270/025* (2013.01); *B23B 2270/08* (2013.01); *Y10T 279/1249* (2015.01); *Y10T 279/17316* (2015.01); *Y10T 279/17351* (2015.01); *Y10T 279/17435* (2015.01)

(56) References Cited

U.S. PATENT DOCUMENTS

| | | | |
|---|---|---|---|
| 9,079,254 | B2 | 7/2015 | Schuffenhauer et al. |
| 2011/0175300 | A1* | 7/2011 | Schuffenhauer ...... B23B 31/305 279/4.06 |
| 2011/0318121 | A1 | 12/2011 | Eriksson |
| 2012/0211950 | A1* | 8/2012 | Matheis ................ B23B 31/028 279/20 |
| 2013/0001896 | A1 | 1/2013 | Herud |
| 2013/0147131 | A1* | 6/2013 | Mitchell ............... B23B 31/205 279/4.09 |
| 2013/0292913 | A1* | 11/2013 | Teusch ................ B23B 31/1178 279/2.06 |
| 2013/0300071 | A1* | 11/2013 | Teusch ................. B23B 31/028 279/9.1 |
| 2013/0309035 | A1 | 11/2013 | Guy |

FOREIGN PATENT DOCUMENTS

| | | | |
|---|---|---|---|
| DE | 102013108105 A1 * | 1/2015 | ........... B23B 31/305 |
| WO | 2007118626 A1 | 10/2007 | |

OTHER PUBLICATIONS

Jan. 12, 2016—First_Office_Action—CN104174888A.

* cited by examiner

US 9,662,714 B2

HYDRAULIC CHUCK WITH A REDUCTION SLEEVE

CROSS-REFERENCE TO RELATED APPLICATION

This application claims priority from Indian Application Number 2319/CHE/2013 filed May 28, 2013, which is hereby fully incorporated herein by reference.

BACKGROUND OF THE INVENTION

The invention relates to a hydraulic chuck and, more particularly, relates to a hydraulic expansion chuck with a reduction sleeve.

Hydraulic expansion chucks typically have a body, an expansion bushing which is received in the body and defines a tool holder receptacle or space for a tool to be chucked, and a pressure chamber which is configured between the expansion bushing and the body.

A shank of a tool to be chucked can be inserted into the tool holder receptacle of such an expansion chuck. The pressure chamber is then put under pressure to provide for the expansion bushing to be loaded against the shank of the tool. The shank of the tool is then held frictionally in the tool holder receptacle space.

When the tool is received in the hydraulic expansion chuck and in operation, high torques are typically transmitted between the expansion chuck and the tool. It has been found that during use the tool or components of the hydraulic expansion chuck may experience undesired movement, axial or otherwise, particularly if there is a reduction or loss of hydraulic pressure in the chuck system. This can result in damage to the tool, damage to the hydraulic expansion chuck, damage to the work piece or can negatively impact the overall quality and/or precision of the cutting operation being performed.

Accordingly, there is a need for improved hydraulic expansion chucks that overcome disadvantages, limitations and shortcomings of known hydraulic expansion chucks.

SUMMARY OF THE INVENTION

In accordance with an aspect of the invention, a hydraulic expansion chuck for receiving a tool includes a chuck body having a mounting member, an expansion bushing which is received in the chuck body and defines a chuck opening, a pressure chamber which is interposed between the expansion bushing and the chuck body, and a reduction sleeve. The reduction sleeve is received in the chuck opening of the expansion bushing and defines a tool holder receptacle for receiving the tool to be chucked. The reduction sleeve includes a connector element configured to cooperate with the mounting member to releasably attach the reduction sleeve to the chuck body. In one aspect, the reduction sleeve also may include an adjustment element configured to adjust the axial position of the tool in the tool holder receptacle. In another aspect, the reduction sleeve includes a plurality of elongated slots that are spaced circumferentially about the reduction sleeve to allow for radial deformation of the reduction sleeve.

In accordance with another aspect of the invention, a hydraulic expansion chuck assembly includes a chuck body having an expansion bushing mounted in the chuck body, the expansion bushing defining a chuck opening and a pressure chamber which is interposed between the expansion bushing and the chuck body. The hydraulic expansion chuck assembly also includes a tool having a cutting portion and a shank portion and a reduction sleeve which is received in the chuck opening of the expansion bushing and defines a tool holder receptacle for receiving the shank portion of the tool. The reduction sleeve includes a connector element configured to releasably attach the reduction sleeve to the chuck body. In one aspect, the reduction sleeve also may include an adjustment element configured to adjust the axial position of the tool in the tool holder receptacle. In another aspect, the reduction sleeve includes a plurality of elongated slots that are spaced circumferentially about the reduction sleeve and extend radially through the reduction sleeve to allow for radial deformation of the reduction sleeve.

In accordance with another aspect of the invention, a reduction sleeve for a hydraulic expansion chuck that receives a tool includes a sleeve body having an axial forward end, an axial rearward end and a sidewall extending therebetween. The sleeve body defines a tool holder receptacle having a receptacle opening adjacent the axial forward end for receiving the tool. The reduction sleeve also includes a connector element for releasably attaching the sleeve body to the hydraulic expansion chuck adjacent an axial rearward end of the sleeve body.

DETAILED DESCRIPTION

Figure 1:
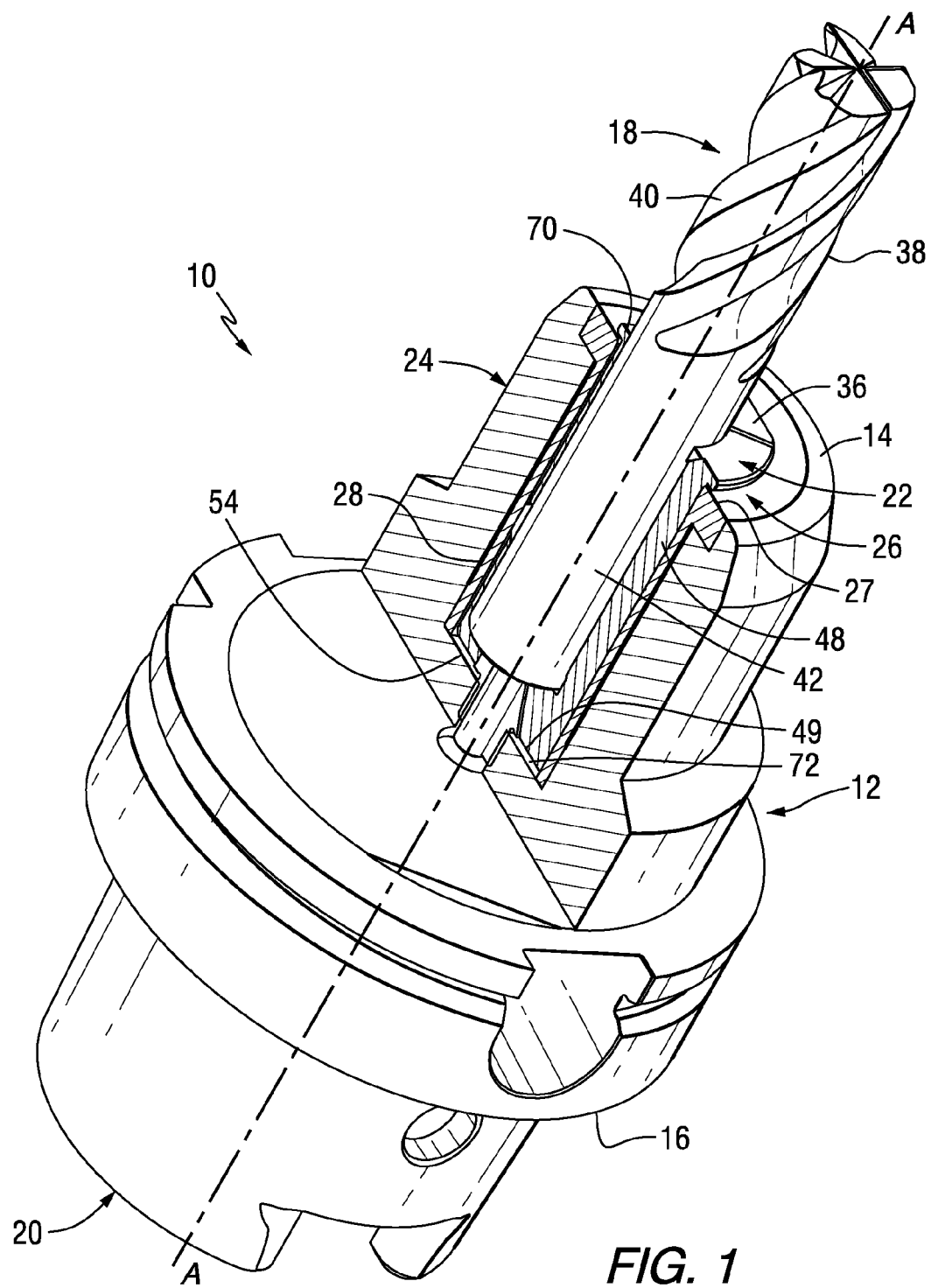
FIG. 1 is an isometric, partial sectional view of a hydraulic expansion chuck assembly, in accordance with an aspect of the invention.
Figure 2:
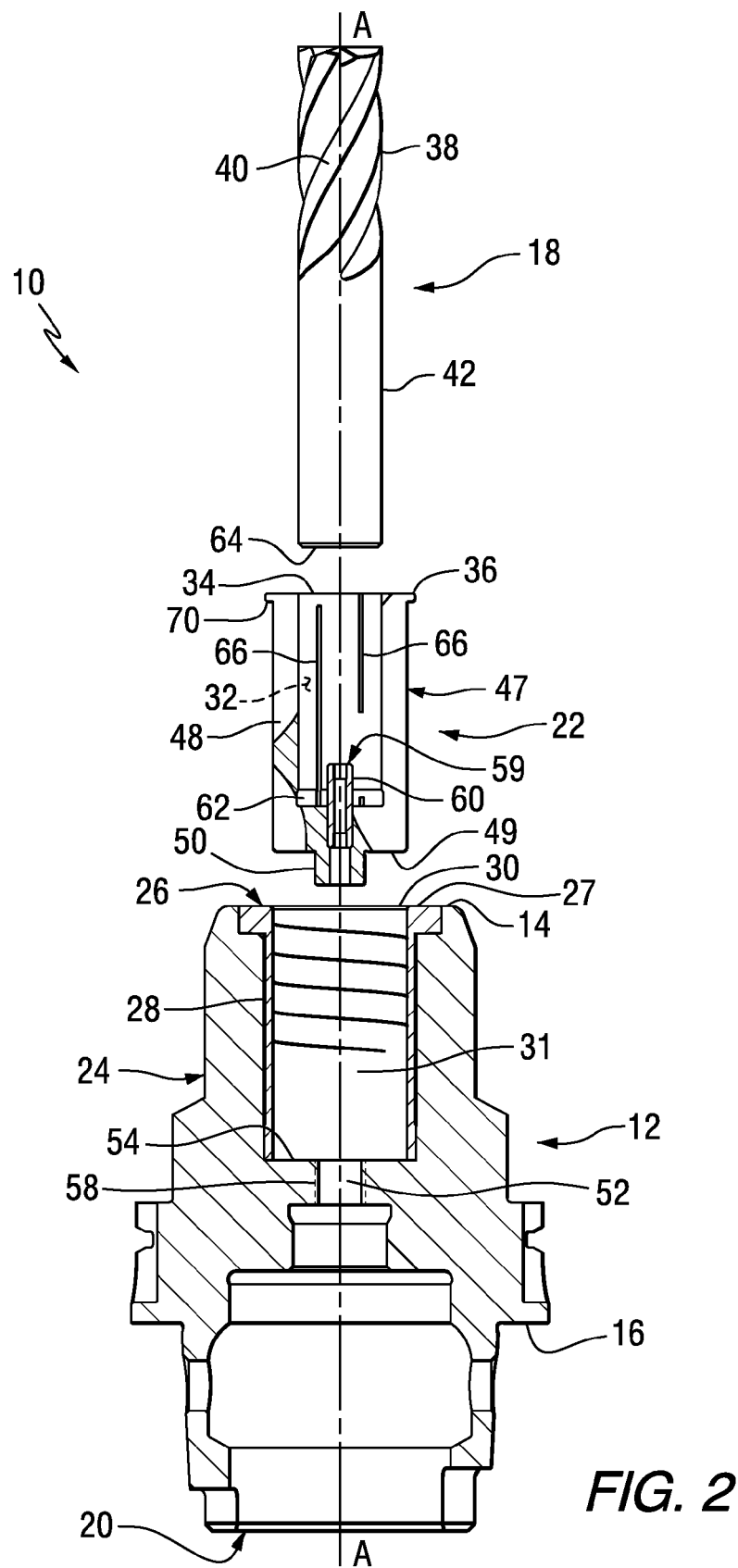
FIG. 2 is an exploded assembly view of the hydraulic expansion chuck assembly shown in FIG. 1, in accordance with an aspect of the invention.

Referring to FIGS. 1-4B, there is illustrates a hydraulic expansion chuck assembly 10 and components thereof, in accordance with various aspects of the invention. The hydraulic expansion chuck assembly 10 includes a hydraulic expansion chuck 12 having a tool receptacle-side end 14 and a machine tool-side end 16. The hydraulic expansion chuck assembly 10 also includes a cutting tool 18 such as, for example, a boring tool or milling cutter or like tool that is configured for receipt in the tool receptacle-side end 14 of the hydraulic expansion chuck 12. The hydraulic expansion chuck assembly 10 further includes a reduction sleeve 22, as will be described in more detail herein, which is configured for receipt in the tool receptacle-side end 14 of the hydraulic expansion chuck 12. The assembly 10 may be connected at the machine tool-side end 16 to a drive adapter 20 for connection or attachment to a machine (not shown) for driving rotation of the hydraulic expansion chuck 12. The hydraulic expansion chuck assembly 10 includes a central longitudinal axis A-A about which the assembly 10 rotates.

The hydraulic expansion chuck 12 includes a chuck body 24 and an expansion bushing 26, both of which may be formed of, for example, steel or suitable like materials. The expansion bushing 26 defines a chuck opening 30 adjacent the tool receptacle-side end 14 and a chuck receptacle 31 (see, for example, FIG. 2).

The hydraulic expansion chuck 12 also includes a pressure chamber 28 which is interposed between the expansion bushing 26 and the chuck body 24. The pressure chamber 28 can be supplied with a hydraulic fluid via ducts (not shown) so that a high pressure builds up in the pressure chamber 28. As a result of this pressure, the expansion bushing 26 is actuated inward elastically in a radial direction for chucking the tool 18.

In one aspect of the invention, the reduction sleeve 22 is inserted in the chuck opening 30 and received in the chuck receptacle 31 defined by the expansion bushing 26. In another aspect, the reduction sleeve 22 is generally cylindrical and the expansion bushing 26 is circumferentially disposed about the reduction sleeve 22 or at least partially circumferentially disposed about the reduction sleeve 22.

The reduction sleeve 22 can be formed of a material having a low thermal conductivity to avoid too much heat from going from the tool 18 to the hydraulic fluid in the pressure chamber 28. In one aspect, the sleeve 22 is formed of at least one of a stainless steel material or a nickel alloy material. Examples of suitable materials include, but are not limited to, nickel alloys such as Hastelloy® or Inconel®.

The tool 18 includes a cutting portion 38 having, for example one or more flutes 40 and a shank portion 42. The reduction sleeve 22 defines a tool holder receptacle 32 for receiving the tool 18 to be chucked. More specifically, the tool holder receptacle 32 defines a receptacle opening 34 adjacent an axial forward end 36 of the reduction sleeve 22 for inserting the shank portion 42 therethrough such that the shank portion 42 is received in the tool holder receptacle 32. The reduction sleeve 22 is comprised of a sleeve body 47 that includes a sidewall 48 extending from the axial forward end 36 thereof to an axial rearward end 49 of the sleeve body 47. In one aspect, the reduction sleeve 22 is circumferentially disposed about the tool 18, e.g. about the shank portion 42, or at least partially circumferentially disposed about the tool 18, e.g. about the shank portion 42.

The reduction sleeve 22 is releasably attachable to the chuck body 24 so as to secure the reduction sleeve 22 to the chuck body 24 for operation of the assembly 10 while allowing for the removal of the reduction sleeve 22 for replacement or repair as may be desired. In one aspect, the invention provides means for attaching the reduction sleeve 22 to the chuck body 24 adjacent an axial rearward end 49 of the reduction sleeve 22. In another aspect, releasably attaching the reduction sleeve 22 is accomplished by, for example, a connector element 50 configured at or adjacent the axial rearward end 49 of the reduction sleeve 22 for cooperating with, for example, a mounting member 52 of the chuck body 24 configured at or adjacent an axial rearward end 54 of the chuck receptacle 31.

In one example, the connector element 50 may include, for example, external threads (generally designated as 56 and shown, for example in FIG. 4A) for cooperating with corresponding mounting threads (generally designated as 58 and shown, for example, in FIG. 2) on the mounting member 52 to provide for releasably attaching the sleeve body 47 to the hydraulic expansion chuck body 24 adjacent an axial rearward end 49 of the sleeve body 47. It will be appreciated that other types of connector elements, mounting members and related components or accessories may be provided for releasably attaching the reduction sleeve 22 to the chuck body 24.

In another aspect of the invention, the reduction sleeve 22 includes a flange 70 adjacent the axial forward end 36 thereof. The flange 70 is configured to engage an axial forward end 27 of the expansion bushing 26. The flange 70 may also be configured for engaging the tool receptacle-side end 14 of the chuck 12. Advantageously, the cooperating engagement between the flange 70 and the axial forward end 27 of the expansion bushing 26 works in conjunction with the connector element 50 and mounting member 52 to further secure the reduction sleeve 22 in the chuck body 24. In one aspect, as the connector element 50 is being attached to the mounting member 52 the flange 70 is pulled firmly against the axial forward end 27 of the expansion bushing 26 to provide the desired clamping arrangement. In another aspect, once assembled a gap 72 may be provided between the axial rearward end 49 of the sleeve body 47 and the axial rearward end 54 of the chuck receptacle 31.

In another aspect of the invention, the reduction sleeve 22 includes an adjustment element 59 for adjusting the axial position of the tool 18 in the tool holder receptacle 32 along axis A-A. This axial adjusting of the tool 18 and, more particularly, of adjusting the position of the shank portion 42 relative to the tool holder receptacle 32 of the reduction sleeve 22 is accomplished by, for example, a set screw assembly 60 configured at least partially within the tool holder receptacle 32 adjacent an axial rearward end 62 of the tool holder receptacle 32 for cooperating with a bottom end 64 of the tool 18. The set screw assembly 60 is movable axially within the tool holder receptacle 32. It will be appreciated that other types of components or assemblies besides the set screw assembly 60 may be provided as the adjustment element 59 for adjusting the axial position of the tool 18 in the tool holder receptacle 32.

In another aspect of the invention, the reduction sleeve 22 includes a plurality of elongated slots 66 that are spaced circumferentially about the reduction sleeve. More specifically, the plurality of elongated slots 66 extend radially through the reduction sleeve 22 to allow for radial deformation of the reduction sleeve 22 when compressed radially by the expansion bushing 26 and for radial expansion when the expansion bushing 26 compression is withdrawn. Advantageously, this allows for tools of varying types and sizes, e.g. shanks of varying diameters to be used in association with the hydraulic expansion chuck 12. It will also be appreciated that the radial flexibility on the sleeve 22 is important to increase the grip, as the pressure will be transmitted from the chuck 12 to the shank 42 of the tool 18 by easily deforming the reducing sleeve 22 as desired. The sleeve 22 is configured to advantageously provide high axial strength and rigidity, but very low radial rigidity.

In one aspect, the plurality of elongated slots 66 are formed in the sidewall 48 of the sleeve body 47 and are spaced circumferentially about the sleeve body 47. In another aspect, the plurality of elongated slots 66 extends radially through the sidewall 48 to the tool holder receptacle 32. In another aspect, the plurality of elongated slots 66 extend axially in the sidewall 48 from the axial forward end 36 of the reduction sleeve 22 to the axial rearward end 49 of the reduction sleeve 22. Alternatively, the plurality of elongated slots 66 may extend axially along only a portion of the sidewall 48, i.e. not extend the entire axial length of the sleeve body 47. In another aspect, the plurality of elongated slots 66 may extend into the axial forward end 36 (see, for example, slot portion 66a in FIG. 4B) and/or the axial rearward end 49 (see, for example, slot portion 66b in FIG. 4B).

Figure 5A:
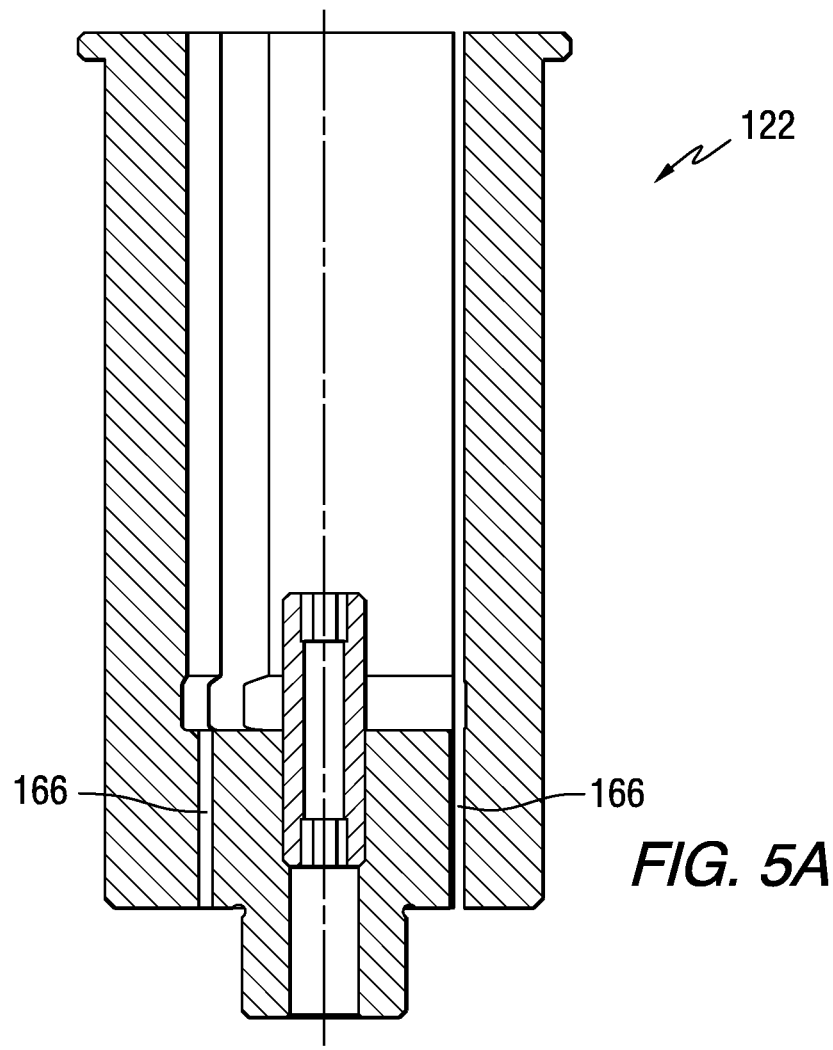
FIG. 5A is a side, sectional view of an additional reduction sleeve, in accordance with an aspect of the invention.
Figure 5B:
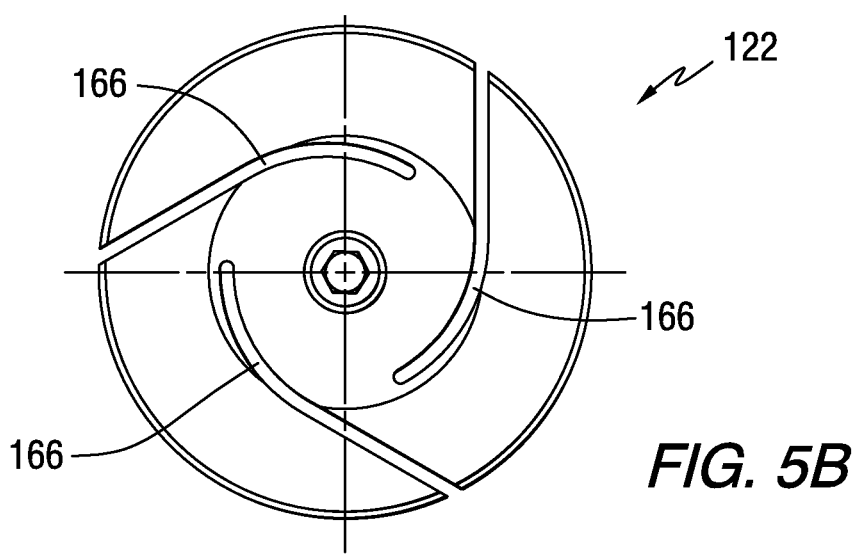
FIG. 5B is a top view of the reduction sleeve shown in FIG. 5A, in accordance with another aspect of the invention.

FIGS. 5A and 5B illustrate an additional reduction sleeve 122, in accordance with an aspect of the invention. The reduction sleeve 122 is generally similar to the reduction sleeve 22 structurally and functionally, as described herein, except that the reduction sleeve 122 includes a plurality of elongated slots 166 that are configured differently as illustrated.

Figure 6A:
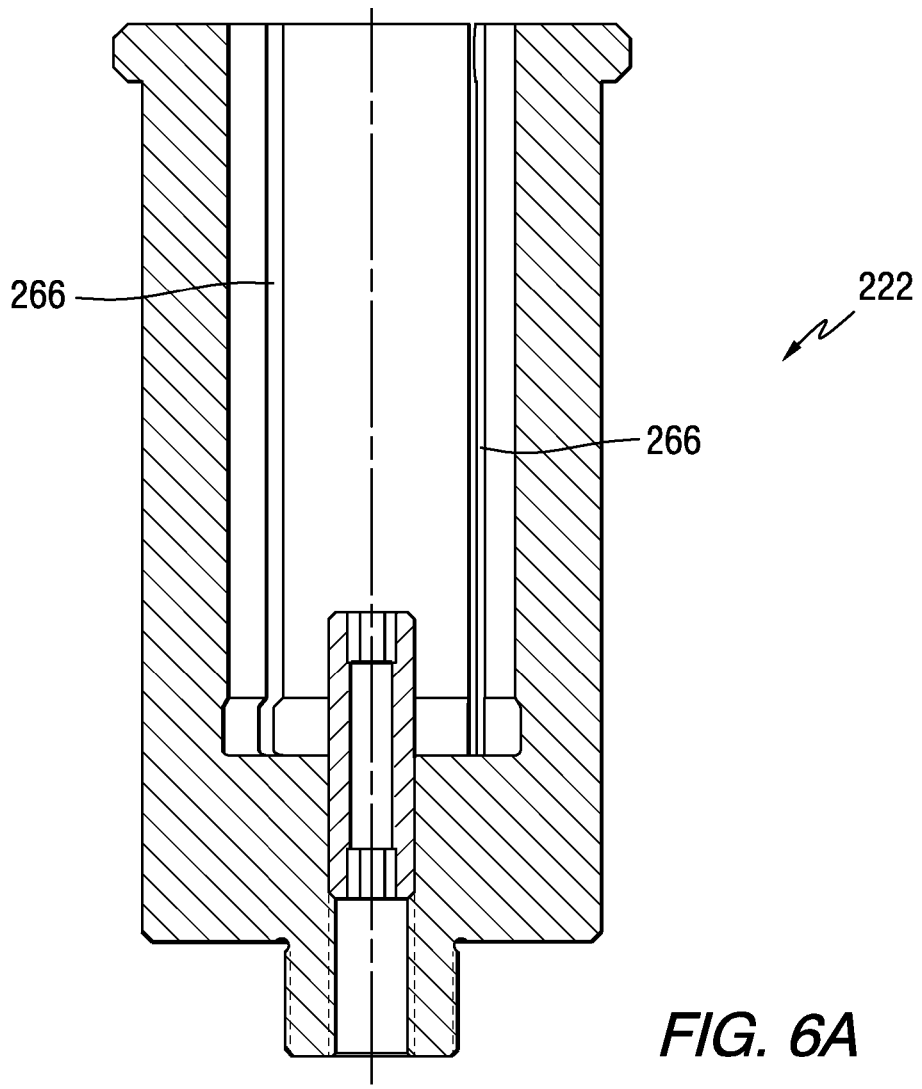
FIG. 6A is a side, sectional view of an additional reduction sleeve, in accordance with an aspect of the invention.
Figure 6B:
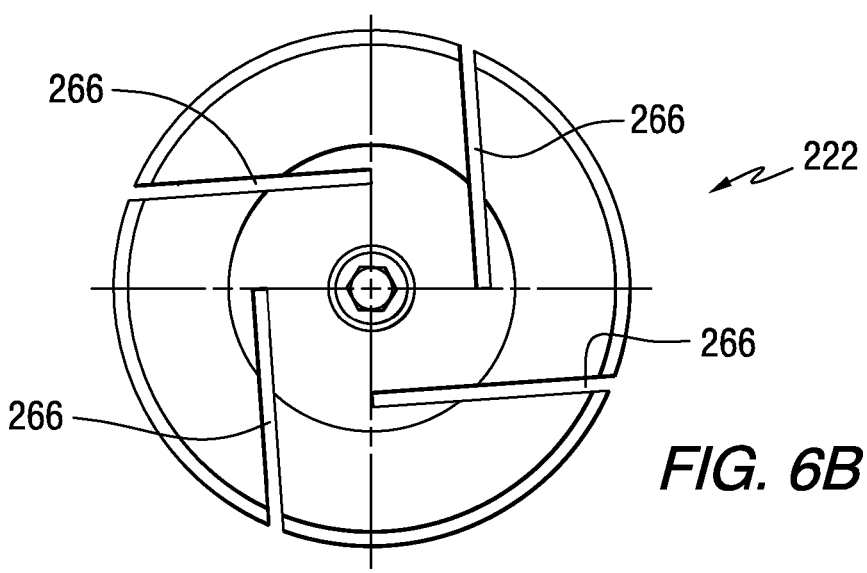
FIG. 6B is a top view of the reduction sleeve shown in FIG. 6A, in accordance with another aspect of the invention.

FIGS. 6A and 6B illustrate an additional reduction sleeve 222, in accordance with an aspect of the invention. The reduction sleeve 222 is generally similar to the reduction sleeves 22 and 122 structurally and functionally, as described herein, except that the reduction sleeve 222 includes a plurality of elongated slots 266 that are configured differently as illustrated.

Figure 7A:
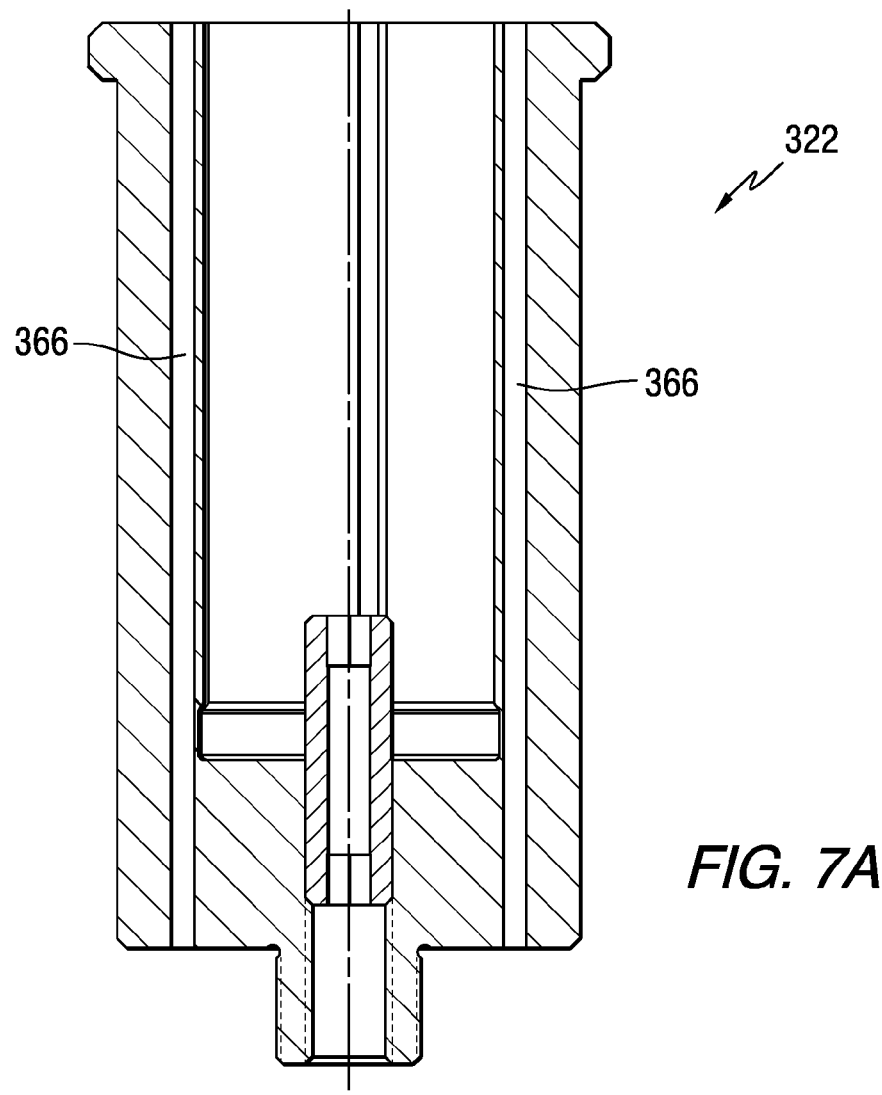
FIG. 7A is a side, sectional view of an additional reduction sleeve, in accordance with an aspect of the invention.
Figure 7B:
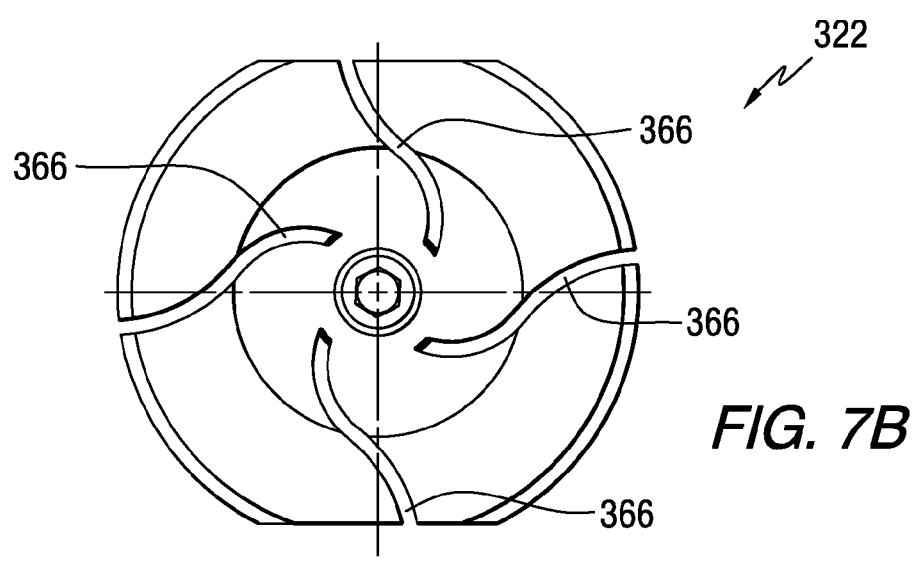
FIG. 7B is a top view of the reduction sleeve shown in FIG. 7A, in accordance with another aspect of the invention.

FIGS. 7A and 7B illustrate an additional reduction sleeve 322, in accordance with an aspect of the invention. The reduction sleeve 322 is generally similar to the reduction sleeves 22, 122 and 222 structurally and functionally, as described herein, except that the reduction sleeve 322 includes a plurality of elongated slots 366 that are configured differently as illustrated.

Figure 8A:
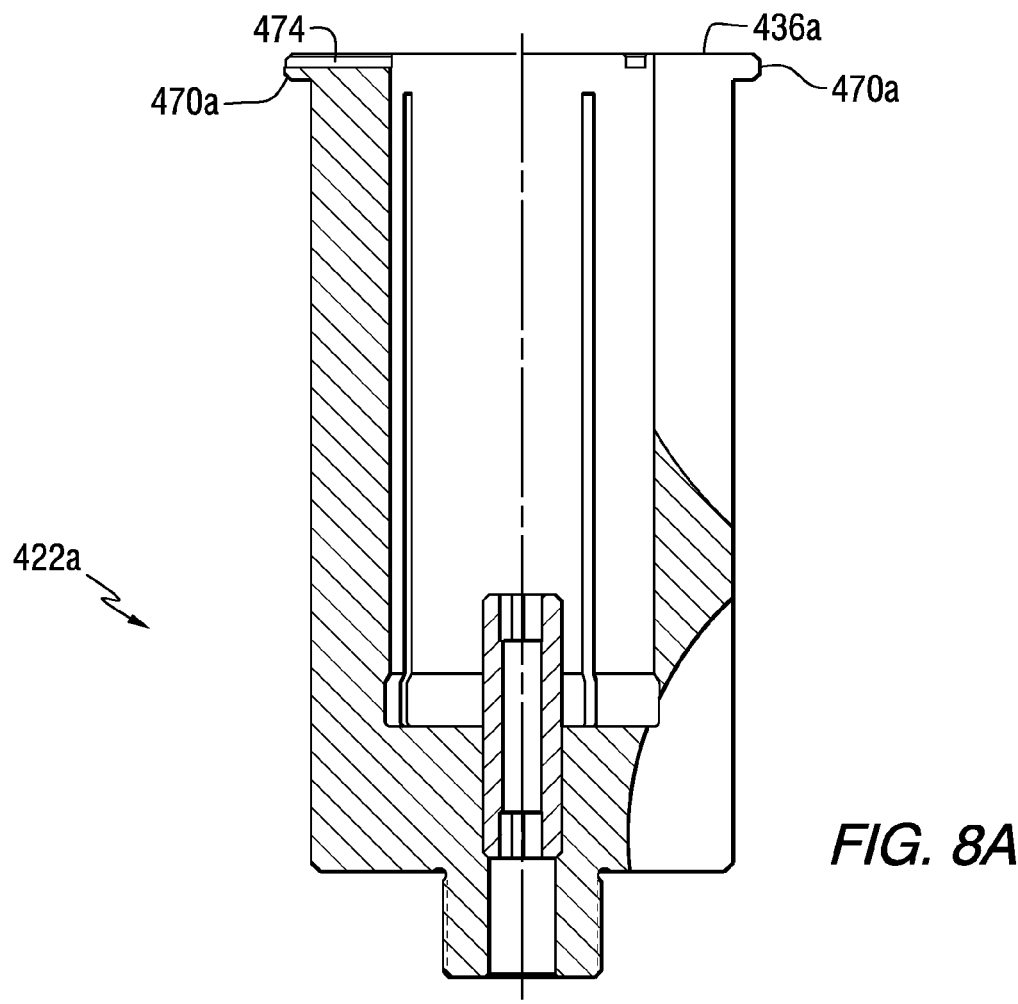
FIG. 8A is a side, sectional view taken along line 8A-8A of FIG. 8, in accordance with an aspect of the invention.
Figure 8:
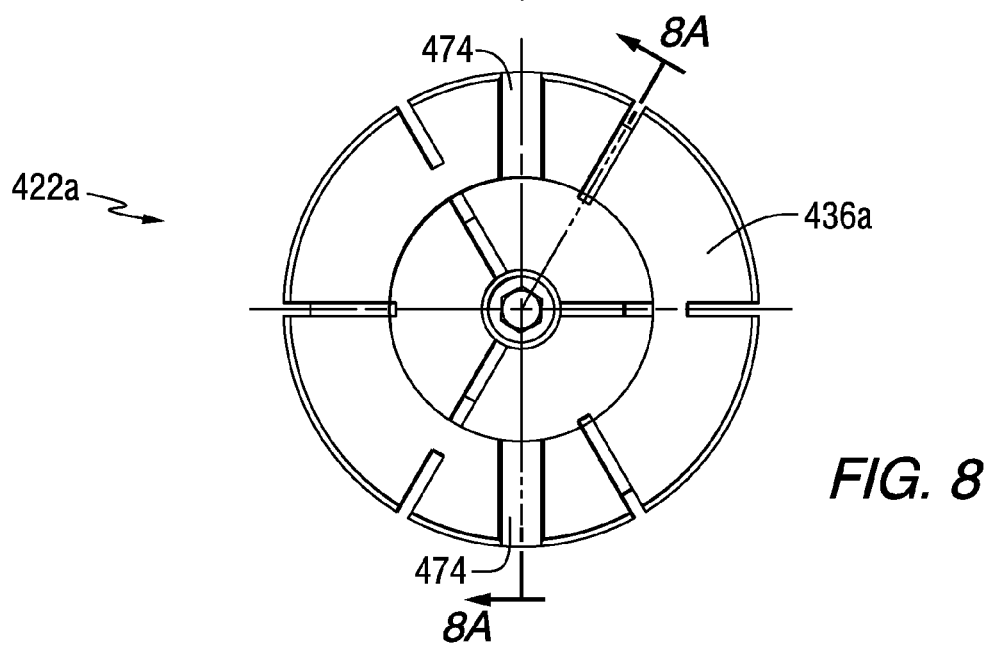
FIG. 8 is a top view of an additional reduction sleeve, in accordance with an aspect of the invention.
Figure 9A:
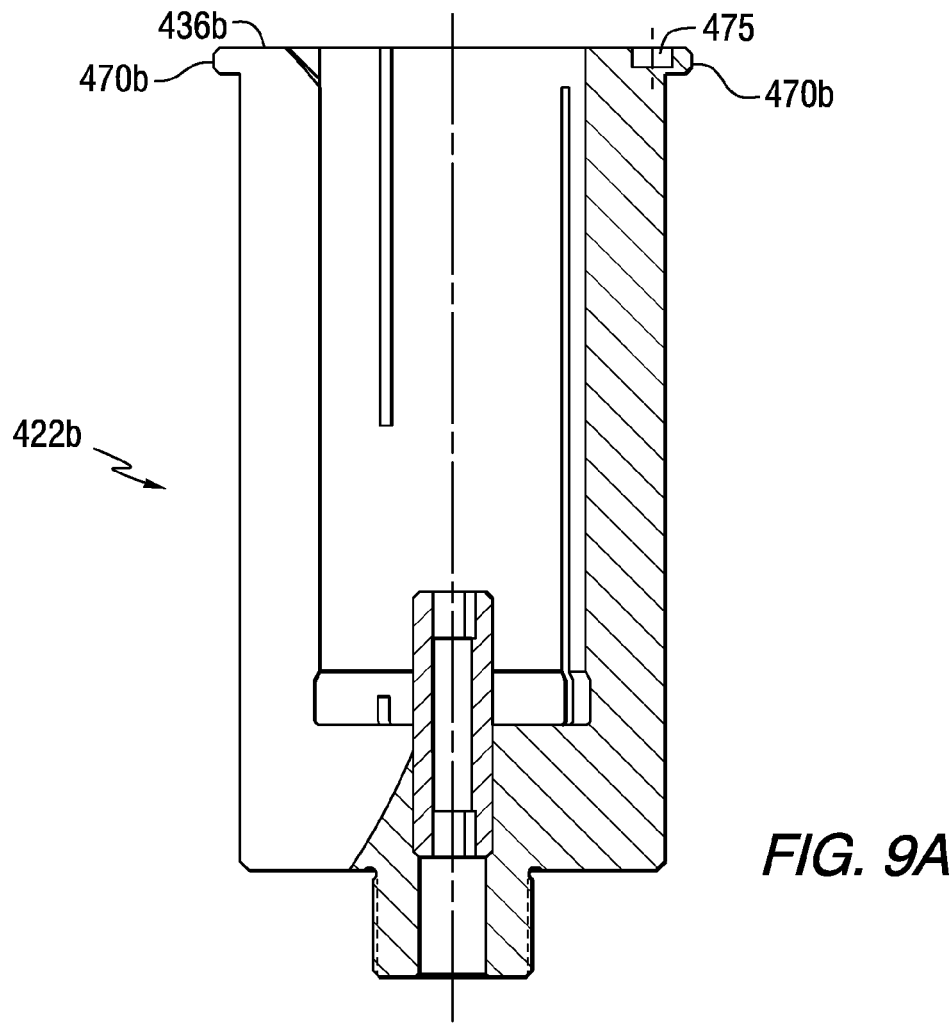
FIG. 9A is a side, sectional view taken along line 9A-9A of FIG. 9, in accordance with an aspect of the invention.
Figure 9:
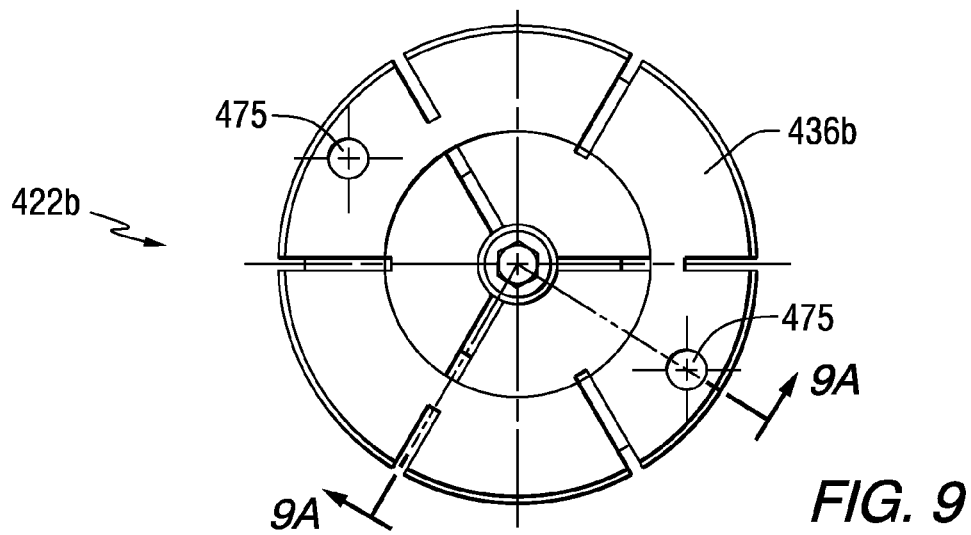
FIG. 9 is a top view of an additional reduction sleeve, in accordance with an aspect of the invention.

In addition, various means for turning or driving, i.e. tightening or loosening the reduction sleeve 22 connector element 50 to cooperate with, i.e. to releasably engage the mounting member 52 of the chuck body 24 are provided. In one aspect, FIGS. 8 and 8A illustrate a reduction sleeve 422a having one or more slots 474 formed in the axial forward 436a and the flange 470a for driving the reduction sleeve 422a. An appropriate tool such as, for example, a screwdriver may be inserted into the slot(s) 474 for driving or turning the reduction sleeve 422a. In another aspect, FIGS. 9 and 9A illustrate a reduction sleeve 422b having one or more apertures 475 formed in the axial forward 436b and the flange 470b for driving the reduction sleeve 422b.

Figure 10A:
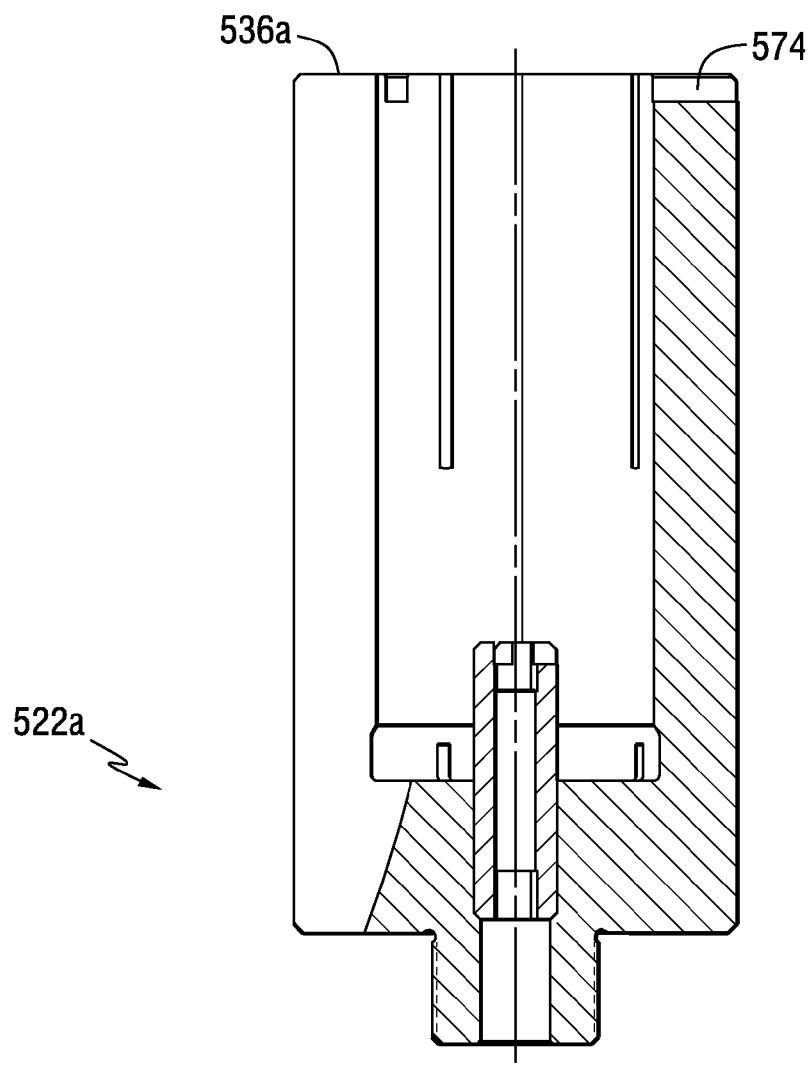
FIG. 10A is a side, sectional view taken along line 10A-10A of FIG. 10, in accordance with an aspect of the invention.
Figure 10:
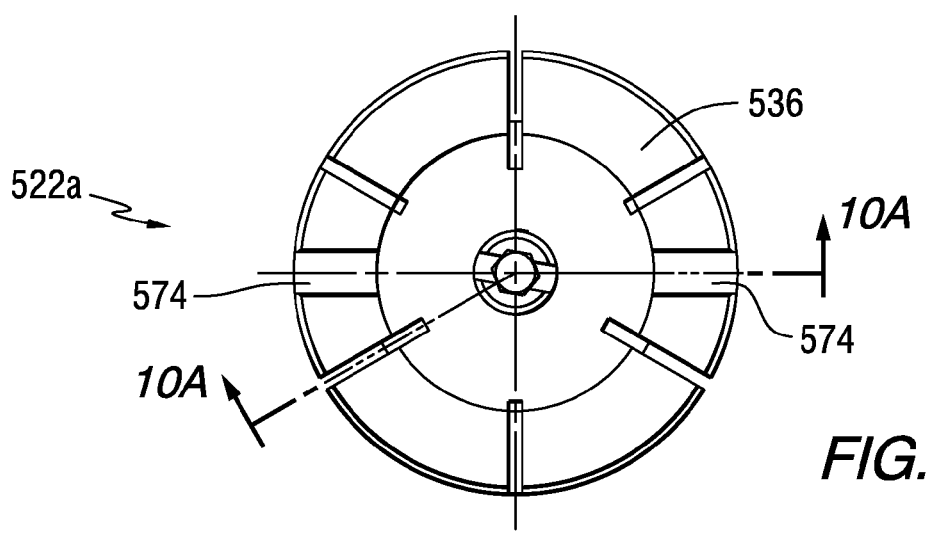
FIG. 10 is a top view of an additional reduction sleeve, in accordance with an aspect of the invention.
Figure 11A:
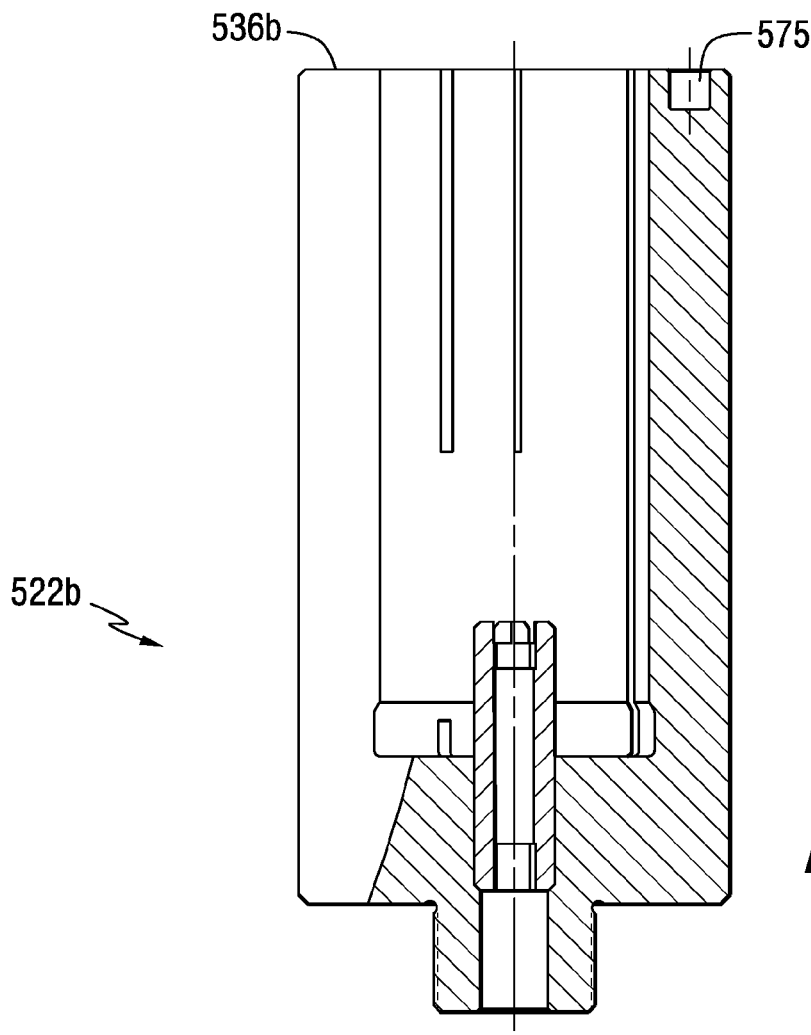
FIG. 11A is a side, sectional view taken along line 11A-11A of FIG. 11, in accordance with an aspect of the invention.
Figure 11:
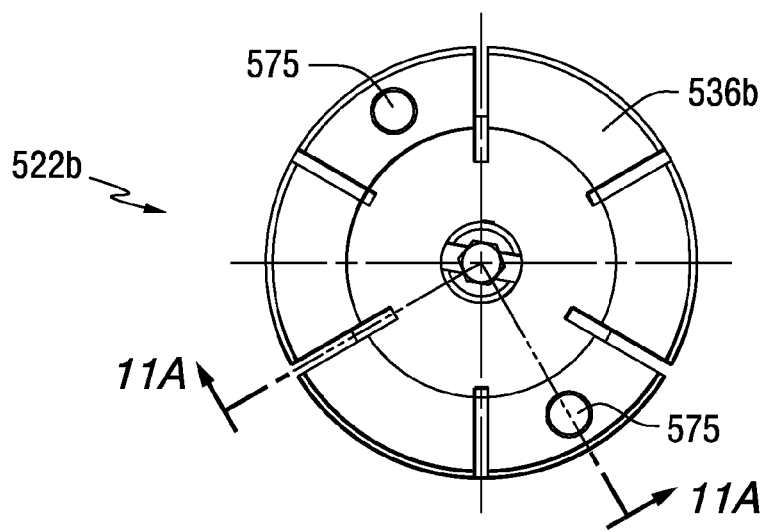
FIG. 11 is a top view of an additional reduction sleeve, in accordance with an aspect of the invention.

In another aspect, FIGS. 10 and 10A illustrate a reduction sleeve 522a having one or more slots 574 formed in the axial forward 536a, but not having a flange, for driving the reduction sleeve 522a. In another aspect, FIGS. 11 and 11A illustrate a reduction sleeve 522b having one or more apertures 575 formed in the axial forward 536b, but not having a flange, for driving the reduction sleeve 522b.

Figure 12A:
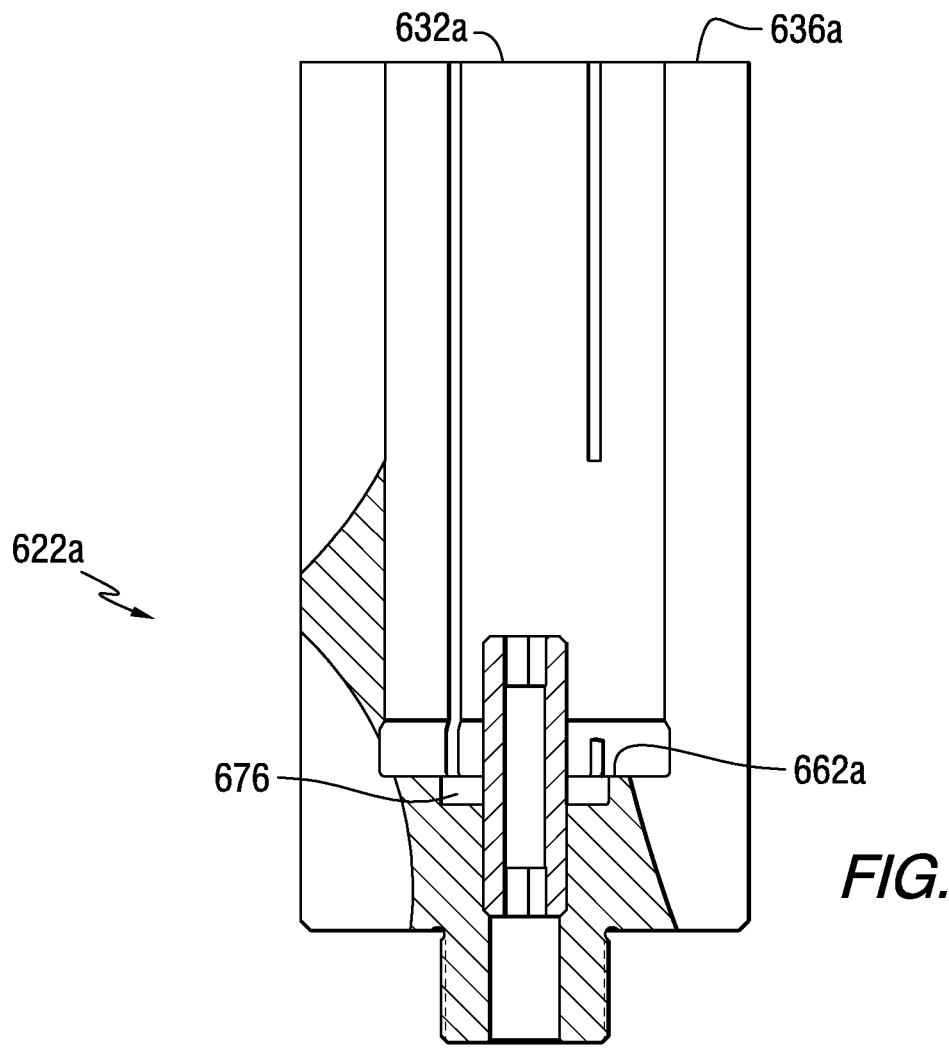
FIG. 12A is a side, sectional view taken along line 12A-12A of FIG. 12, in accordance with an aspect of the invention.
Figure 12:
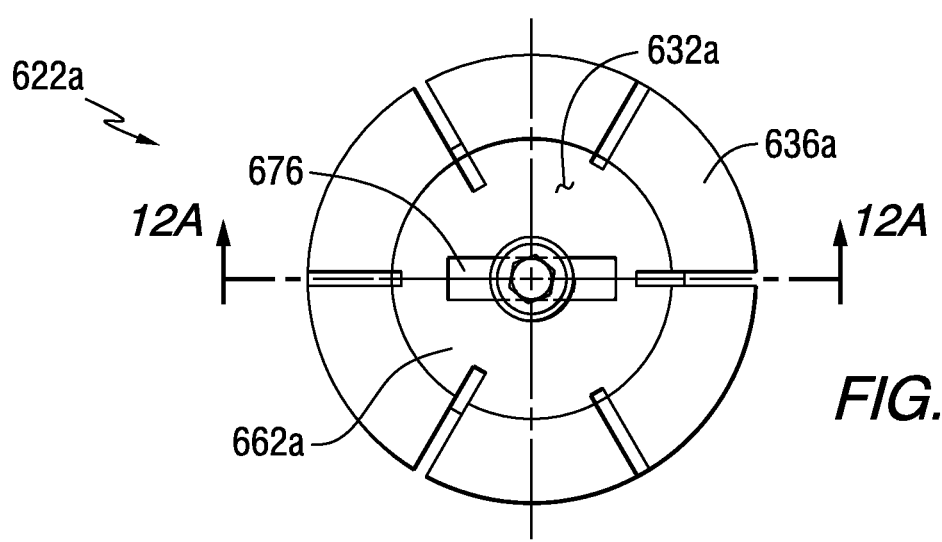
FIG. 12 is a top view of an additional reduction sleeve, in accordance with an aspect of the invention.
Figure 13A:
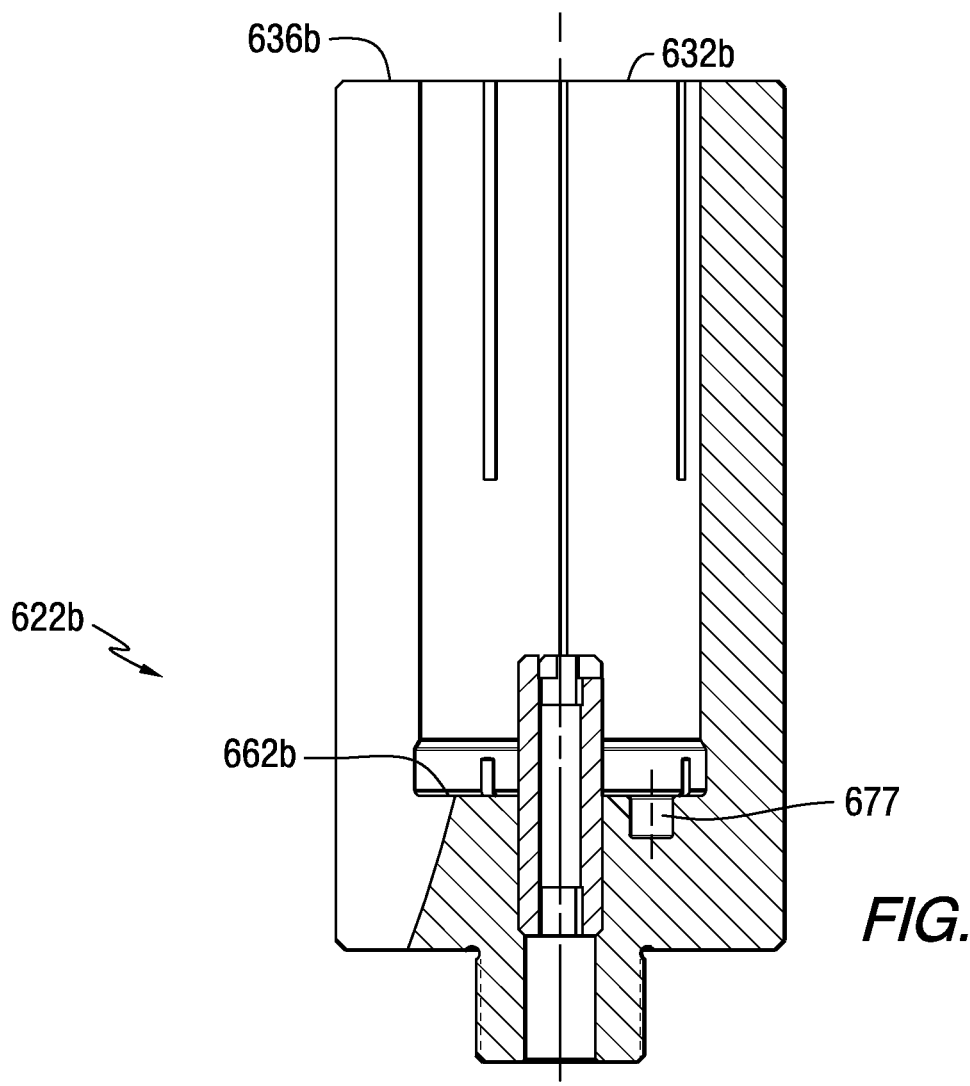
FIG. 13A is a side, sectional view taken along line 13A-13A of FIG. 13, in accordance with an aspect of the invention.
Figure 13:
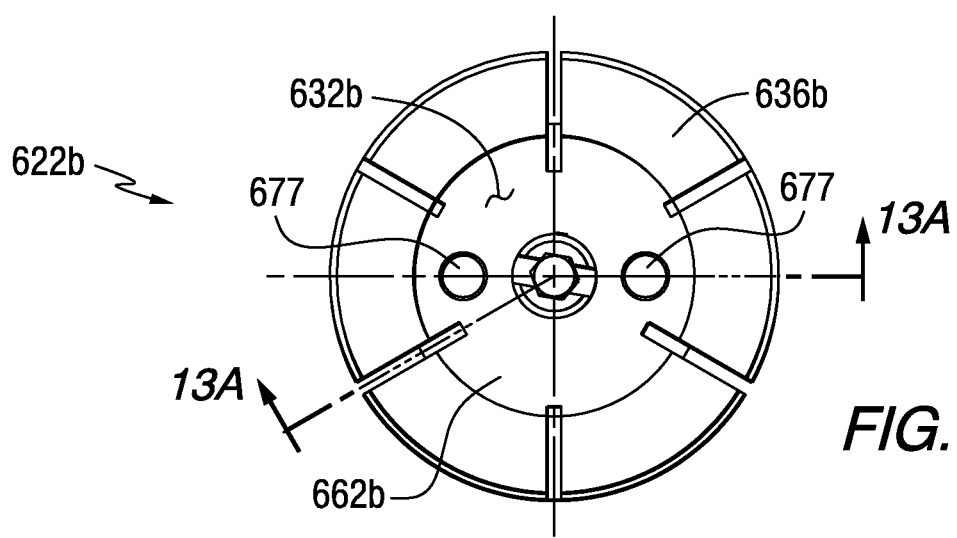
FIG. 13 is a top view of an additional reduction sleeve, in accordance with an aspect of the invention.
Figure 14A:
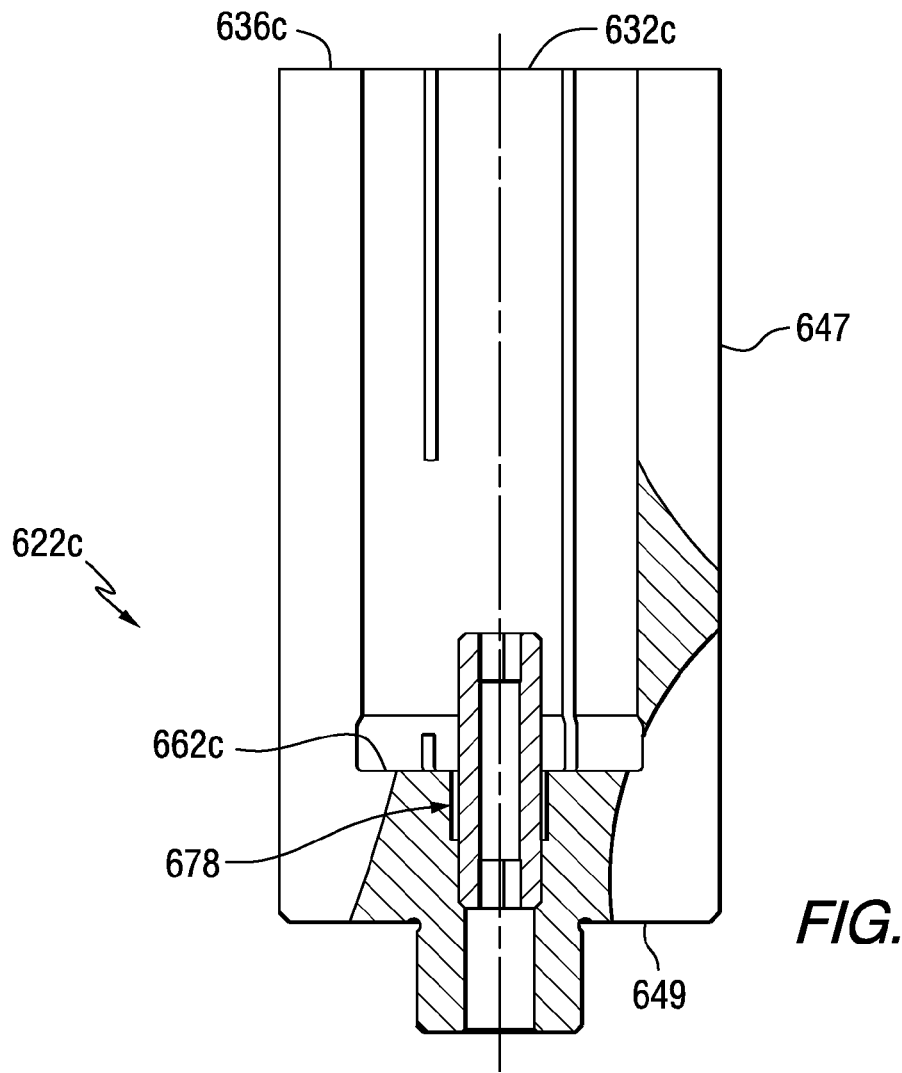
FIG. 14A is a side, sectional view taken along line 14A-14A of FIG. 14, in accordance with an aspect of the invention.
Figure 14:
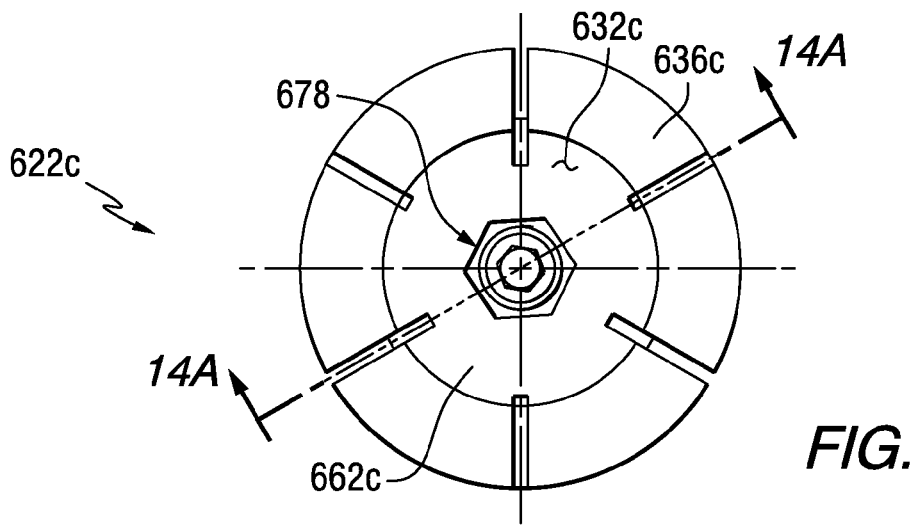
FIG. 14 is a top view of an additional reduction sleeve, in accordance with an aspect of the invention.

In another aspect, FIGS. 12 and 12A illustrate a reduction sleeve 622a (not having a flange at the axial forward end 636a) having a slot 676 formed adjacent an axial rearward end 662a of the tool holder receptacle 632a for driving the reduction sleeve 622a. An appropriate tool such as, for example, a screwdriver may be inserted into the slot 676 for driving or turning the reduction sleeve 622a. In another aspect, FIGS. 13 and 13A illustrate a reduction sleeve 622b (not having a flange at the axial forward end 636b) having one or more apertures 677 formed adjacent an axial rearward end 662b of the tool holder receptacle 632b for driving the reduction sleeve 622b. In yet another aspect, FIGS. 14 and 14A illustrate a reduction sleeve 622c (not having a flange at the axial forward end 636c) having a hex nut assembly 678 formed adjacent an axial rearward end 662c of the tool holder receptacle 632c for driving the reduction sleeve 622c.

Figure 3:
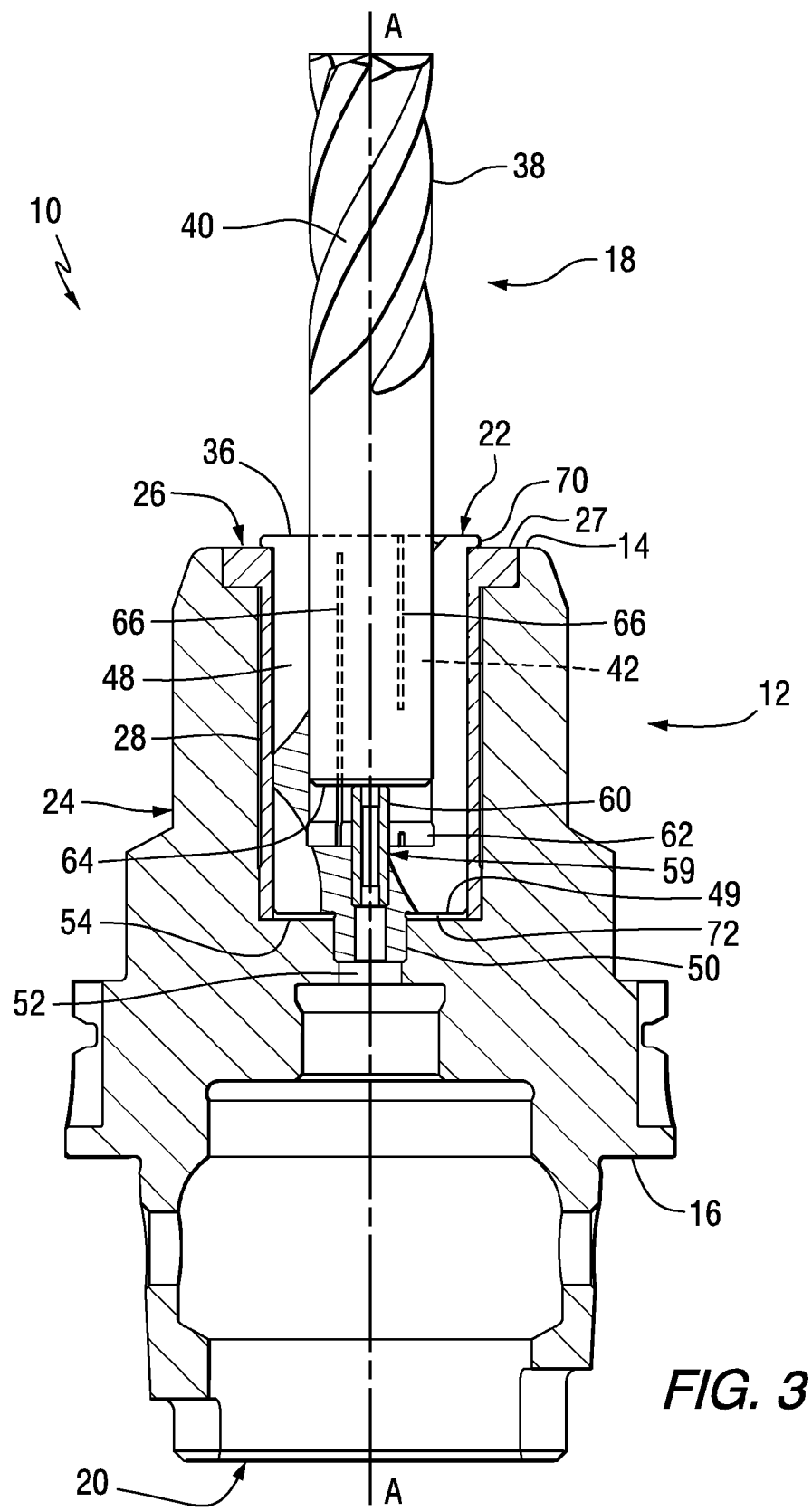
FIG. 3 is a side, partial sectional view of the hydraulic expansion chuck assembly shown in FIG. 2 as assembled, in accordance with an aspect of the invention.
Figure 4A:
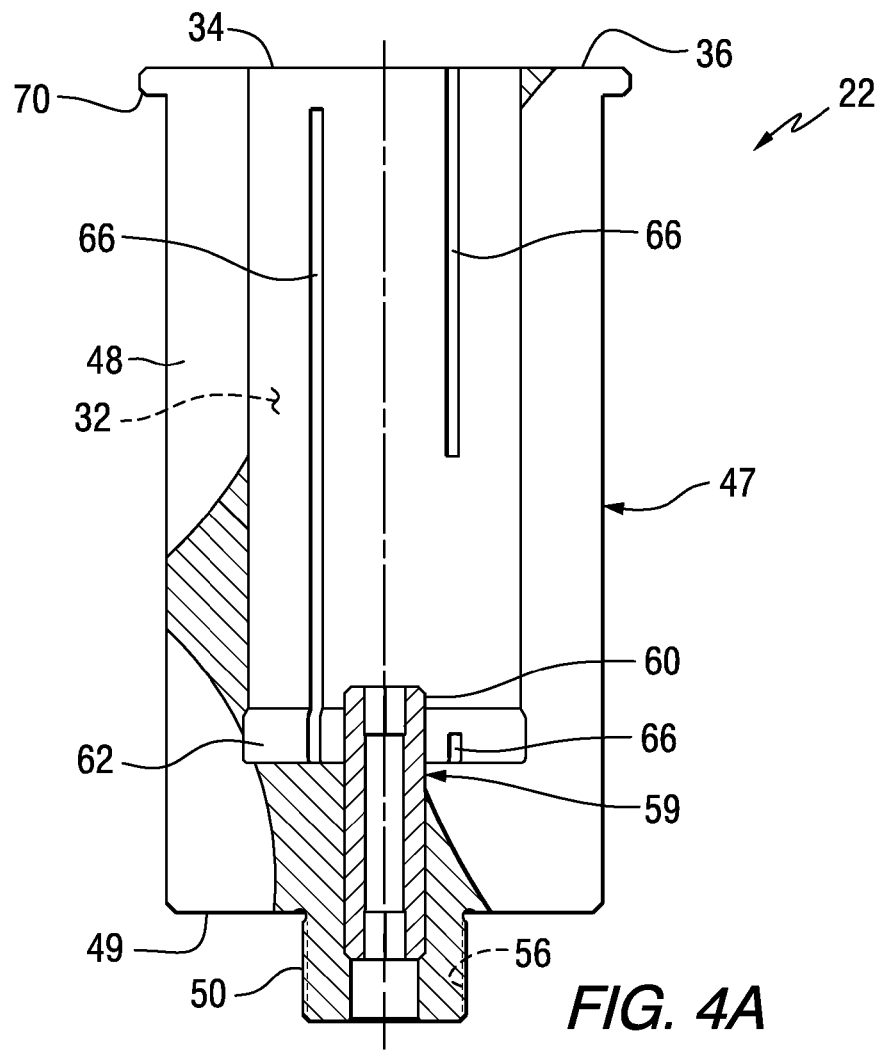
FIG. 4A is a side, partial sectional view of a reduction sleeve shown in FIGS. 1-3, in accordance with an aspect of the invention.
Figure 4B:
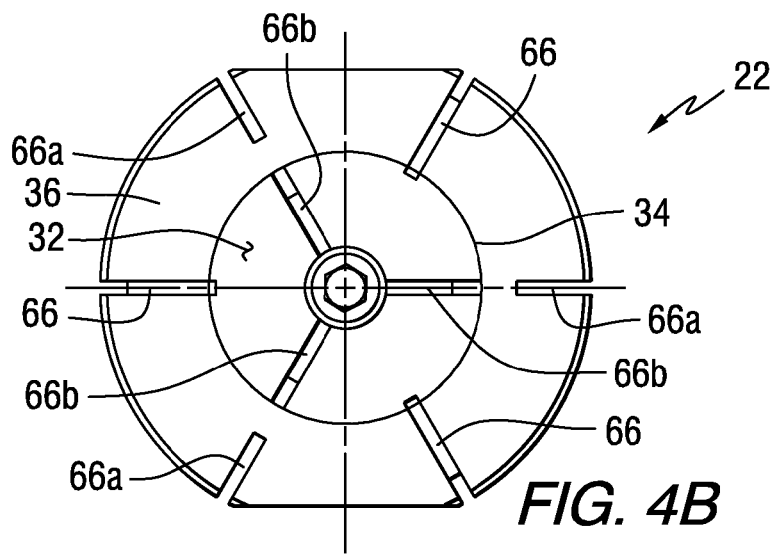
FIG. 4B is a top view of the reduction sleeve shown in FIG. 4A, in accordance with another aspect of the invention.
Figure 15:
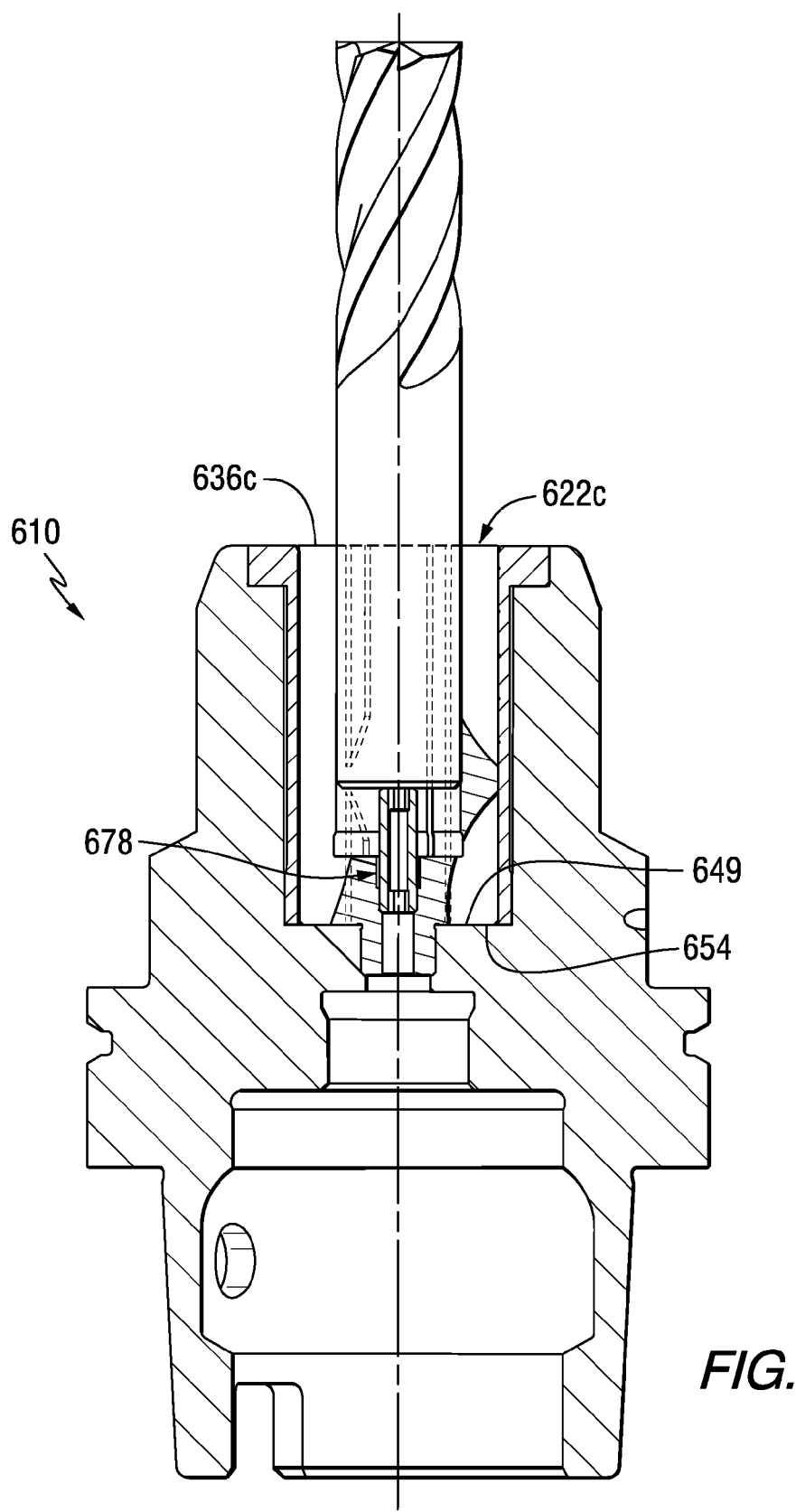
FIG. 15 is a side, partial sectional view of an additional hydraulic expansion chuck assembly, in accordance with an aspect of the invention.

FIG. 15 illustrates an additional hydraulic expansion chuck assembly 610 (that is similar to assembly 10 described and illustrated herein) which includes the reduction sleeve 622c with hex assembly 678 and that does not have a flange at the axial forward end 636c. By not having the flange at the axial forward end 636c, the axial rearward end 649 of the sleeve body 647 is configured to engage or contact the axial rearward end 654 of the chuck receptacle when the sleeve 622c is turned or driven to tighten the sleeve 622c (i.e. no gap 72 as shown in FIG. 3 is provided or remains after tightening). Advantageously, this prevents undesired twisting of the sleeve 622c during turning. It will be appreciated that all of the reduction sleeves described and illustrated herein that do not have the flange at the axial forward end may be configured similarly to engage or contact the axial rearward end of the chuck receptacle.

Whereas particular aspects of this invention have been described above for purposes of illustration, it will be evident to those skilled in the art that numerous variations of the details of the present invention may be made without departing from the invention as defined in the appended claims.

What is claimed is:

1. A hydraulic expansion chuck for receiving a tool, comprising:
  a chuck body having a mounting member;
  an expansion bushing which is received in the chuck body and defines a chuck opening;
  a pressure chamber which is interposed between the expansion bushing and the chuck body; and
  a reduction sleeve which is received in the chuck opening of the expansion bushing and defines a tool holder receptacle for receiving the tool to be chucked, wherein the reduction sleeve includes a connector element configured to cooperate with the mounting member to releasably attach the reduction sleeve to the chuck body, wherein the reduction sleeve includes a plurality of elongated slots that extend radially through the reduction sleeve to allow for radial deformation of the reduction sleeve; and wherein at least two of the plurality of elongated slots extend into an axial rearward end of the reduction sleeve.

2. The hydraulic expansion chuck of claim 1, wherein the connector element is formed adjacent an axial rearward end of the reduction sleeve.

3. The hydraulic expansion chuck of claim 2, wherein the expansion bushing defines a chuck receptacle in communication with the chuck opening and the mounting member is formed adjacent an axial rearward end of the chuck receptacle.

4. The hydraulic expansion chuck of claim 1, wherein the reduction sleeve includes an adjustment element configured to adjust the axial position of the tool in the tool holder receptacle.

5. The hydraulic expansion chuck of claim 1, wherein the reduction sleeve includes means for driving the reduction sleeve to cooperate with the mounting member of the chuck body.

6. The hydraulic expansion chuck of claim 1, wherein the expansion bushing is circumferentially disposed about the reduction sleeve and the reduction sleeve is circumferentially disposed about the tool.

7. The hydraulic expansion chuck of claim 1, wherein the reduction sleeve is formed of at least one of a stainless steel material or a nickel alloy material.

8. The hydraulic expansion chuck of claim 1, wherein the reduction sleeve includes a flange adjacent an axial forward end thereof and the flange is configured to engage an axial forward end of the expansion bushing.

9. A hydraulic expansion chuck assembly, comprising:
a hydraulic chuck having a chuck body, an expansion bushing mounted in the chuck body wherein the expansion bushing defines a chuck opening in communication with a chuck receptacle and a pressure chamber which is interposed between the expansion bushing and the chuck body;
a tool having a cutting portion and a shank portion; and
a reduction sleeve which is received in the chuck opening of the expansion bushing and defines a tool holder receptacle for receiving the shank portion of the tool, wherein the reduction sleeve includes a connector element configured to releasably attach the reduction sleeve to the chuck body,
wherein the reduction sleeve includes a plurality of elongated slots that extend radially through the reduction sleeve to allow for radial deformation of the reduction sleeve; and
wherein at least two of the plurality of elongated slots extend into an axial rearward end of the reduction sleeve.

10. The hydraulic expansion chuck assembly of claim 9, wherein the chuck body includes a mounting member formed adjacent an axial rearward end of the chuck receptacle that is configured to cooperate with the connector element that is formed adjacent an axial rearward end of the reduction sleeve to provide the releasable attachment between the chuck body and the reduction sleeve.

11. The hydraulic expansion chuck assembly of claim 9, wherein the reduction sleeve includes an adjustment element configured to engage the tool and adjust the axial position of the tool in the tool holder receptacle.

12. The hydraulic expansion chuck assembly of claim 9, wherein the reduction sleeve includes a flange adjacent an axial forward end thereof and the flange is configured to engage an axial forward end of the expansion bushing.

13. A reduction sleeve for a hydraulic expansion chuck that receives a tool, the reduction sleeve comprising:
a sleeve body having an axial forward end, an axial rearward end and a sidewall extending therebetween, wherein the sleeve body defines a tool holder receptacle having a receptacle opening adjacent the axial forward end for receiving the tool; and
a connector element for releasably attaching the sleeve body to the hydraulic expansion chuck adjacent the axial rearward end of the sleeve body,
wherein the reduction sleeve includes a plurality of elongated slots that extend radially through the reduction sleeve to allow for radial deformation of the reduction sleeve; and
wherein at least two of the plurality of elongated slots extend into the axial rearward end of the reduction sleeve.

14. The reduction sleeve of claim 13, wherein the sleeve body is formed of at least one of stainless steel material or a nickel alloy material.

15. The reduction sleeve of claim 13, further including an adjustment element configured to adjust the axial position of the tool in the tool holder receptacle.

16. The reduction sleeve of claim 13, further including a flange adjacent an axial forward end thereof, wherein the flange is configured to engage the hydraulic expansion chuck.

* * * * *